INVENTOR
Willard T. McCormick
BY
Fryer, Tjensvold, Feix & Phillips
ATTORNEYS

INVENTOR.
Willard T. McCormick 3,379,133
MODULATION CONTROL FOR A
HYDRAULIC CIRCUIT
Willard T. McCormick, Peoria, Ill., assignor to Caterpillar Tractor Co., Peoria, Ill., a corporation of California
Filed Apr. 29, 1966, Ser. No. 546,372
5 Claims. (Cl. 103—37)

ABSTRACT OF THE DISCLOSURE

A modulation control for minimizing pressure fluctuations in a hydraulic system having a variable displacement hydraulic pump and a pressure control valve which is located remote from the pump includes a modulating valve connected in fluid flow relationship between the output of the pump and the stroke control of the pump. The modulating valve is responsive to the pressure from the remote pressure control valve and modulates all of the fluid flowing to and from the stroke control of the variable displacement pump.

---

This application relates to a modulation control for a hydraulic circuit. This application relates particularly to a modulation control for minimizing large recurring pressure fluctuations in a hydraulic circuit having one or more adjustable pressure relief valves situated at a location which is remote from a variable displacement pump.

The modulation control of the present invention was developed to minimize large recurring pressure fluctuations in a hydraulic circuit for an inertia welding machine. The welding machine welds parts by pressing adjacent ends of the parts together while the parts are rotated relative to one another. The rubbing contact and the pressure with which the parts are pressed together heats the interface between the parts to a hot plastic condition, and the parts are forged together by the forces applied.

In welding machines of this type the entire energy needed to weld the parts may preferably be stored in a rotating flywheel, or inertial weight, before the parts are engaged. In some cases it may also be desirable to apply an increased upsetting force to the parts after relative rotation has ended. The welding machine therefore requires a drive motor for rotating the flywheel up to the desired speed and a ram for applying the engagement pressure and, in some cases, an upsetting force to the parts.

A hydraulic system, having a variable displacement hydraulic pump for supplying pressurized fluid to a hydraulic drive motor and to a hydraulic ram, is in most cases preferable to an electrical or mechanical system. The machine operating parameters, rotational speeds and loading forces, will vary for different sizes of parts and different materials. With a hydraulic system the machine parameters can be easily changed by resetting controls at an operator's station. In most cases, because of machine design considerations, the operator's station is apt to be somewhat remote from the pump. This situation, that is, the remote location of the hydraulic system pressure regulating controls and several rapid changes in volume requirement in the system in short periods of time, has caused problems of large recurring pressure fluctuations in the hydraulic system.

Pressure fluctuations, as high as 75 to 600 p.s.i., have been encountered. The fluctuations result from hunting of the pressure compensating system of commercially available variable displacement pumps. Although some of the prior art variable displacement pumps have a built-in modulation feature in a pressure control valve associated with the pump to minimize pressure fluctuations due to overrun of the pressure compensator or stroking cylinder, the use of remote pressure controls has resulted in the effective loss of the modulating feature.

It is quite important that the pressure fluctuations be eliminated or reduced to an insignificant amount. The pressure fluctuations can cause such oscillation of the needle of the pressure gauges used by the operator as to make it difficult for the operator to adjust the pressure valves properly. The pressure fluctuations can also result in a pulsating contact pressure at the weld interface. The pulsations can also result in poor quality or inadequate welds.

It is therefore a primary object of the present invention to minimize large recurring pressure fluctuations in a hydraulic circuit having a variable displacement, pressure compensated hydraulic pump and a pressure control valve which is remote from the pump.

In accordance with the present invention a modulation control is incorporated in the circuit for minimizing the pressure fluctuations. The modulation control includes a valve which is connected in fluid flow relationship between the output of the pump and the stroke control. A hydraulic line connects the modulating valve to the outlet of the remote pressure control valve, and the modulating valve is responsive to the pressure from the remote pressure control valve to modulate the pressure of the fluid supplied to the stroke control. The remote pressure control valve is adjustable to vary the circuit pressure to be maintained by the relief valve. The modulating valve includes a valve spool which is spring-biased in one direction by a spring which exerts a constant preload on the valve spool regardless of the pressure setting of the remote control valve. The pressurized fluid from the remote pressure control valve applies a force to the valve spool in a direction opposed to the spring. Since the preload on the valve spool is always the same, and because the dynamic characteristics of the modulating valve are always the same, regardless of the setting of the remote control valve, the amount of spool travel and degree of modulation and resulting magnitude of pressure fluctuations in the hydraulic circuit are not affected by the setting of the remote valve or the maximum pressure in the circuit. A modulation control which embodies the above-described features constitutes a specific object of the present invention.

Other and further objects of the present invention will be apparent from the following description and claims and are illustrated in the accompanying drawings which, by way of illustration, show a preferred embodiment of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 2:
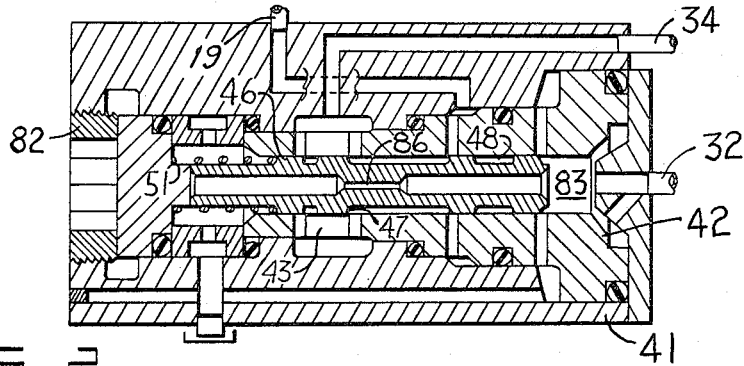
FIG. 2 is a cross-sectional view of the modulating valve incorporated in the circuit shown in FIG. 1 and shows the modulating valve in one condition of operation in which the valve is positioned for maximum reduction of pump displacement.
Figure 3:
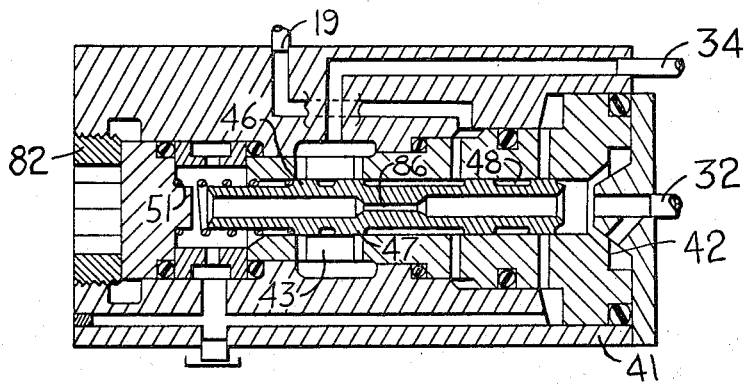
Figure 4:
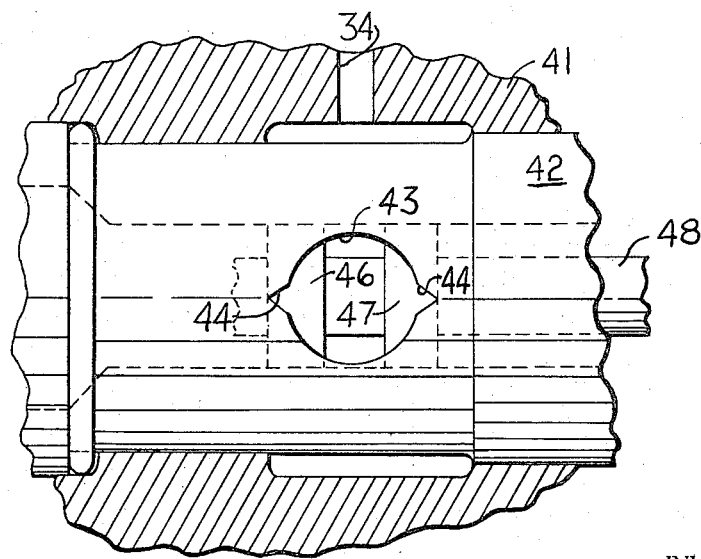

FIG. 3 is a view like FIG. 2 but shows the modulating valve in another condition of operation in which the valve is positioned to maintain the pump displacement at the existing level; and FIG. 4 is a fragmentary enlarged view taken along the line and in the direction of the arrows 4—4 in FIG. 3 showing details of the slotted ports and of the land arrangement for providing fine modulation of the output pressure from the modulating valve.

Figure 1:
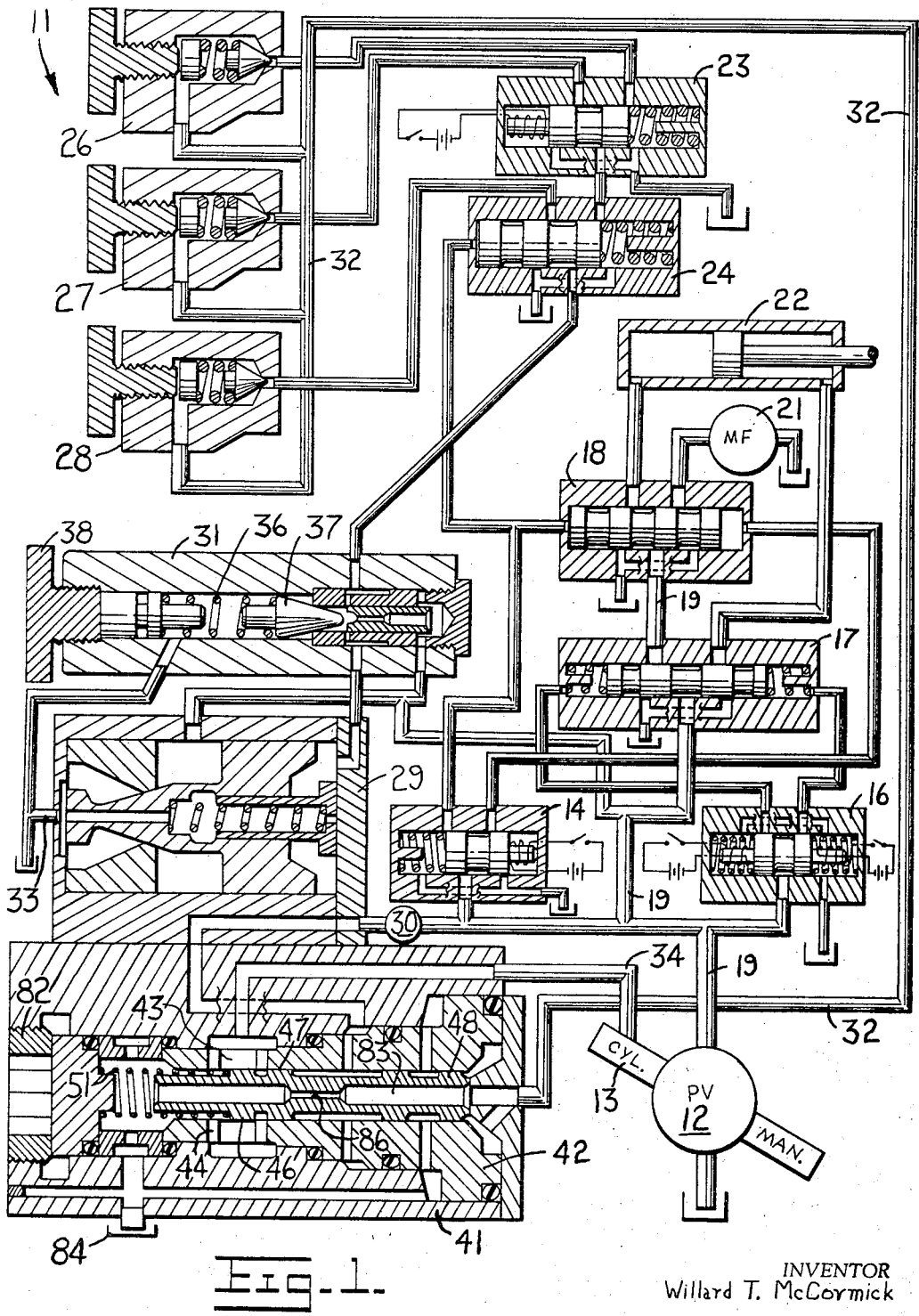
FIG. 1 is a view of a hydraulic circuit which includes a modulation control constructed in accordance with one embodiment of the present invention.

In FIG. 1 a hydraulic circuit for an inertia welding machine is indicated generally by the reference numeral 11.

The circuit 11 includes a variable displacement hydraulic pump 12 which is driven by an electric motor, not shown. The pump displacement, or output, is regulated by a spring-biased, single acting stroke control 13.

The circuit 11 includes solenoid-actuated selector valves 14 and 16, a pilot valve 17 and a control valve 18 for directing the pump output, through conduit 19, to either a fluid-actuated, rotary spindle drive motor 21 or a hydraulic ram 22.

The circuit 11 also includes a solenoid-actuated selector valve 23 and a control valve 24 for selecting one of three remote pressure control valves 26, 27, and 28 as the valve to regulate the fluid pressure in the hydraulic circuit during a particular phase of operation. Each pressure control valve is manually adjustable as illustrated.

The circuit 11 includes a dump valve 29 for bypassing excess pressurized fluid from the pump 12. The position of the dump valve 29 is under the control of the one of valves 26, 27, 28 and a poppet relief valve 31 which has the lower spring preload and is in communication with the pump discharge line 19.

The hydraulic circuit thus far described could be connected for operation by connecting the conduit 32 (the outlet conduit for the remote pressure control valves 26, 27 and 28) and the conduit 33 (the outlet conduit for the dump valve 29) with the conduit 34 (the inlet conduit for the stroke control 13). This type of connection would be basically the prior art practice. It has the disadvantage of making the size of recurring pressure fluctuations dependent upon dynamic characteristics of the dump valve 29 and poppet valve 31, the size of the preload imposed by the spring 36 on the valve element 37 by the adjustable knob 38 of the poppet valve 31, and the overall level of the circuit pressure selected by the remote pressure control valves 26, 27, and 28. The pressure fluctuations which would be produced by such a prior art circuit connection would not only be variable for different circuit pressures but also would be quite large in all cases. The dynamic characteristics of the relatively large components of the dump valve 29 in particular would produce sufficiently large fluctuations in the pressure supplied to the stroke control 13 to cause the output pressure in the conduit 19 to cycle or hunt about the desired pressure level.

In accordance with the present invention a modulation control which includes a modulating valve 41 is incorporated in the circuit 11. The modulating valve is connected in fluid flow relationship between the output conduit 19 of the variable displacement pump 12 and the input conduit 34 to the stroke control 13. The modulating valve 41 is responsive to the pressure from the remote pressure control valve, through conduit 32, to modulate the pressure of fluid supplied to the stroke control 13.

A compensated fixed flow regulator valve 30 is disposed in the inlet to the modulating valve 41. Valve 30 permits only a fixed amount (for example, 0.5 gallon per minute) of oil to be directed to the modulating valve 41 regardless of the pressure level in the system and the conduit 19. The compensated fixed flow regulator valve 30 insures that a constant volume of oil is directed to the modulating valve 41 regardless of the pressure in the system with the result that a constant rate pump shift is accomplished regardless of system pressure.

The modulating valve 41 includes a valve sleeve 42 fixed in position in the valve casing. The sleeve 42 has a pair of ports 43 for transmitting fluid to the conduit 34 of the stroke control 13. As best shown in FIG. 4, each of the ports 43 has V-shaped slots 44 which coact with a pair of axially spaced lands 46 and 47 of a valve spool 48 which is axially slidable within the sleeve 42. The tapered portions 44 of the ports 43 permit a fine modulation of the pressurized fluid transmitted through the ports 43.

The valve spool 48 is biased in one direction, to the right as viewed in FIGS. 1, 2 and 3, by spring 51. The preload is set by threaded adjustment screw 82, and once set, the preload is not thereafter changed for any condition of operation of the hydraulic circuit. The preload exerted by the spring 51 is preferably in the order of 15 p.s.i.

The right-hand end of the valve spool 48 is formed with a chamber 83 which is open to the pressure in the conduit 32. The chamber 83 is connected to drain 84 through an orifice 86 extending axially through the center of the valve spool.

When the volume of fluid passing through the remote control valve 26, 27 or 28 at the pressure required for the actuation of the machine component (as determined by the adjustment of that control valve) exceeds the volume that can pass through the orifice 86 at the preload setting of the spring 51, the differential created by flow through the orifice will cause the spool 48 to shift to the left, as viewed in FIGS. 1, 2, and 3. As the valve spool 48 shifts to the left, the land 47 will open the V-groove 44 and then the circular portion of the port 43 and permit pressure fluid from conduit 19 to be transmitted through the port 43 to the conduit 34. The flow of pressurized fluid through the conduit 34 to the stroke control 13 reduces the displacement of the pump and the volume of fluid delivered to the output conduit 19. FIG. 2 shows the spool shifted leftward to its maxmium extent.

FIG. 1 shows the valve spool 48 shifted to its maximum rightward position where the land 46 uncovers the port 43 to bleed pressure from the conduit 34 and stroke control 13. In this position of spool 48 the displacement of the pump is increased at the maximum rate.

FIG. 3 shows the disposition of the spool 48 when the pressure in the circuit is substantially the same as that called for by the particular pressure control valve in operation at that time. In this position, the valve spool will oscillate to a very limited extent and will hold the pressure fluctuations within the range of approximately 10 p.s.i. This small range of pressure fluctuation is possible because of the dynamic characteristics of valve 41—the small preload of the spring 51 and the small mass of the spring 51 and the spool 48—and the fact that the valve spool moves a set amount for a given pressure change at any level of pressure in the hydraulic circuit.

The fact that the entire amount of fluid going to the stroke control 13 must pass through the modulating valve 41 also adds stability in the system by retarding the rate of change of the pump output.

The preload of spring 36 is normally adjusted to a level higher than the preload of the springs in remote control valves 26, 27, and 28 such that the relief valve 31 functions only to limit the maximum pressure in the circuit due to malfunction or incorrect adjustment of the remote control valves.

In summary, the solenoid actuated selector valves 14, 16 and 23 are actuated manually or automatically to connect the pump output to the motor 21 or the ram 22 and to select one of the remote pressure control valves 26, 27 or 28 as the operative valve to regulate the level of pressure in the circuit. After the initial change in pressure level as a result of going from the control of one remote pressure control valve to another, and following any actuation of the dump valve 29 which may be necessary to accommodate a change in pump displacement more rapid than can be effected by the modulating valve 41, the modulating valve 41 operates (as described above) to maintain a quite stabilized pressure level in the hydraulic circuit. Thus, large recurring pressure fluctuations are eliminated through the incorporation of the modulating valve 41 in the circuit 11 in the manner described in detail above.

While I have illustrated and described the preferred embodiment of my invention, it is to be understood that this is capable of variation and modification, and I therefore do not wish to be limited to the precise details set forth, but desire to avail myself to such changes and alterations as fall within the purview of the following claims.

What is claimed is:

1. A modulation control for minimizing pressure fluctuations in a hydraulic circuit having a variable displacement, pressure compensated hydraulic pump, a stroke control for varying the displacement of the pump, a dump valve for bypassing excess pressurized fluid, a relief valve for limiting the maximum pressure in the circuit, and a pressure control valve remote from the pump for selecting the pressure maintained in the circuit, said modulation control comprising, modulating valve means connected in fluid flow relationship between the output of the pump and the stroke control and responsive to the pressure from the remote pressure control valve to modulate the pressure of the fluid supplied to the stroke control first conduit means directing the entire amount of fluid flow to and from the stroke control through said modulating valve means and second conduit means connecting the remote pressure control valve to the modulating valve means to transmit the pressure at the remote pressure control valve to the modulating valve means.

2. A modulation control as defined in claim 1 wherein the hydraulic circuit contains a plurality of remote pressure control valves effective in sequence to establish a corresponding plurality of circuit pressures and conduit means connecting each of the remote pressure relief valves to the modulating valve means.

3. A modulation control as defined in claim 1 wherein the modulating valve means include a valve spool, resilient means biasing the valve spool in one direction, and chamber and orifice means responsive to the flow of pressurized fluid from the remote pressure control valve to apply a force to the valve spool in a direction opposed to the resilient means, and wherein the valve spool has lands cooperating with tapered ports to provide a fine regulation of the pressurized fluid supplied to the stroke control.

4. A modulation control as defined in claim 3 wherein the remote pressure control valve includes adjustment means for varying the circuit pressure to be maintained by the relief valve and wherein the resilient means exert a constant preload on the valve spool regardless of the pressure setting of the remote valve so that the amount of spool travel and degree of modulation and resulting magnitude of pressure fluctuations in the circuit are not affected by the setting of the remote valve or the maximum pressure in the circuit.

5. A modulation control as defined in claim 1 including a compensated fixed flow regulator valve disposed at the inlet to the modulating valve means and effective to insure a constant volume of fluid flow to the modulating valve means regardless of system pressure.

References Cited

UNITED STATES PATENTS

| | | | |
|---|---|---|---|
| 371,063 | 10/1887 | Hays | 251—205 |
| 2,238,061 | 4/1941 | Kendrick | 103—1 |
| 2,512,799 | 6/1950 | Huber | 130—1 |
| 2,526,361 | 10/1950 | Johnson | 251—205 |
| 2,733,732 | 2/1956 | Baker | 103—37 XR |
| 2,867,091 | 1/1959 | Orloff et al. | 103—37 XR |
| 2,894,458 | 7/1959 | Hallman | 103—1 |
| 2,975,717 | 3/1961 | Rynders et al. | 103—1 |
| 3,020,716 | 2/1962 | Greenly | 103—37 XR |
| 3,186,353 | 5/1965 | Taplin | 103—162 |

FOREIGN PATENTS 801,069  9/1958  Great Britain.

FRED C. MATTERN, Jr., *Primary Examiner.*

ROBERT A. O'LEARY, *Examiner.*

T. R. HAMPSHIRE, *Assistant Examiner.*